US012669209B2

(12) United States Patent
Makarchuk et al.

(10) Patent No.: US 12,669,209 B2
(45) Date of Patent: Jun. 30, 2026

(54) FASTENERS FOR A MANIFOLD

(71) Applicant: ADVANCED DRAINAGE SYSTEMS, INC., Hilliard, OH (US)

(72) Inventors: Irena Makarchuk, Fairfield, CT (US); Paul Holbrook, Old Saybrook, CT (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 18/961,245

(22) Filed: Nov. 26, 2024

(65) Prior Publication Data

US 2025/0084942 A1      Mar. 13, 2025

Related U.S. Application Data

(63) Continuation of application No. 18/127,627, filed on Mar. 28, 2023, now Pat. No. 12,188,600.

(51) Int. Cl.
 *F16L 47/32*      (2006.01)
 *F16L 41/02*      (2006.01)
(52) U.S. Cl.
 CPC ............. *F16L 47/32* (2013.01); *F16L 41/021* (2013.01)
(58) Field of Classification Search
 CPC .......... F16L 47/32; F16L 41/021; F16L 47/26
 USPC ............................................ 285/133.11, 419
 See application file for complete search history.

(56) References Cited

U.S. PATENT DOCUMENTS 413,133 A * 10/1889 Denison ................. H02G 3/086
                                                           285/133.11
624,770 A * 5/1899 Eibee ................... F16L 55/171
                                                                    24/25

1,225,867 A * 5/1917 Schumacher ....... F16L 19/0225
                                                                       285/332
4,478,252 A   10/1984 Mcloughlin
4,860,799 A * 8/1989 Van Noten .............. F16L 47/22
                                                                       138/167
4,915,424 A * 4/1990 Sarno .................... F16L 41/021
                                                                       285/373
5,277,459 A   1/1994 Braun
5,300,732 A * 4/1994 Wambeke ............ G02B 6/4476
                                                                  174/DIG. 11
5,846,412 A * 12/1998 Tharp ............... B01F 23/23124
                                                                       210/220
5,905,231 A * 5/1999 Houte ................ B60R 16/0215
                                                                         174/95

(Continued)

FOREIGN PATENT DOCUMENTS

DE       102016100309       7/2016
EP              1630920       3/2006
KR         20090007813       1/2009

OTHER PUBLICATIONS

International Search Report and Written Opinion from PCT/US2024/021879, May 27, 2024; 8 pages.

*Primary Examiner* — David Bochna

(74) *Attorney, Agent, or Firm* — FINNEGAN, HENDERSON, FARABOW, GARRETT & DUNNER L.L.P.

(57) ABSTRACT

Fasteners for fastening at least two parts, comprising one or more pins and one or more tabs on a first part, one or more holes and one or more connectors on a second part, and wherein the one or more pins of the first part are inserted into the one or more holes of the second part and the one or more tabs of the first part are snapped onto the one or more connectors of the second part to form a manifold.

20 Claims, 15 Drawing Sheets

(56)                    References Cited

U.S. PATENT DOCUMENTS

| | | | |
|---|---|---|---|
| 6,283,670 B1 * | 9/2001 | Blankinship | H02G 15/113 |
| | | | 403/313 |
| 6,311,734 B1 | 11/2001 | Petrovic | |
| 6,505,865 B2 * | 1/2003 | Minemyer | F16L 21/06 |
| | | | 285/373 |
| 7,350,834 B2 | 4/2008 | Ryhman | |
| 8,042,839 B2 | 10/2011 | Rammhofer | |
| 8,336,923 B2 | 12/2012 | Vautour | |
| 8,746,746 B1 | 6/2014 | Schafer et al. | |
| 8,967,674 B2 | 3/2015 | Douglass, III et al. | |
| 9,404,258 B2 * | 8/2016 | Yun | E04C 5/165 |
| 9,815,229 B2 | 11/2017 | Douglass, III et al. | |
| 10,113,669 B2 | 10/2018 | Logan | |
| 12,188,600 B2 * | 1/2025 | Makarchuk | F16L 47/26 |
| 2013/0327415 A1 | 12/2013 | Camp | |
| 2023/0213138 A1 | 7/2023 | Breyer | |

* cited by examiner

100

100

100

100

200

300

300

400

400

FASTENERS FOR A MANIFOLD

CROSS REFERENCE TO RELATED APPLICATIONS

This application is a continuation of U.S. patent application Ser. No. 18/127,627, filed Mar. 28, 2023, now U.S. Pat. No. 12,888,600, the entire disclosure of which is incorporated herein by reference.

TECHNICAL FIELD

The present disclosure relates to fasteners and/or couplers for connecting and/or snapping two parts together. In particular, the present disclosure relates to universal fasteners to snap two identical parts together seamlessly to create a manifold such as a tee and/or elbow manifold that provides a secure connection.

BACKGROUND

Current fasteners connecting pipes and pipe parts allow user(s) and/or practitioner(s) to form manifolds. However, current fasteners may not allow for the snapping of two parts to form such manifolds quickly and effectively. Providing for quick and facile connection between parts may be vital for a user(s) and or a practitioner(s), especially when out in the field. Moreover, currently known fasteners that may allow for a quick connection to form a manifold do not allow for a secure and snug connection, wherein such a connection is structurally sound and prevents leaking. Furthermore, fasteners that allow for a secure connection are typically cumbersome and require much labor and time on the part of the user(s) and/or practitioner(s) to use to form such manifolds. Therefore, since current fasteners do not comprise structure(s) and/or feature(s) that allow for secure, snug, facile, and quick snapping of two parts to form a manifold, these current fasteners hinder the user(s) and/or practitioner(s) from quickly and securely forming such manifolds.

Given this, there exists an overwhelming need for a fastener that allows a user(s) and/or a practitioner(s) to quickly and securely connect two parts together to form a manifold, wherein the manifold has a secure and sound connection with minimal leaking. Such a fastener will require structure(s) and/or feature(s) that allows for such a snug and secure fit in a quick, facile, and effective manner.

SUMMARY

Different from conventional solutions, the present disclosure solves the above problem(s) by providing a fastener that allows a user(s) and/or practitioner(s) to quickly and securely connect and/or snap two parts together to form a manifold, wherein such a manifold has a secure and sound connection with minimal leaking. The present disclosure further provides the fastener with structure(s) and feature(s) that allows for a secure, snug, quick, effective, and facile fitting of one part to another to form such a manifold. Thus, the present disclosure allows for a quick way of snapping two parts together to form a structurally-sound manifold.

In one embodiment, a fastener for fastening at least two parts may comprise one or more pins and one or more tabs on a first part, a plurality of holes and one or more connectors on a second part, wherein the one or more pins of the first part are snapped onto or inserted into the one or more holes of the second part and the one or more tabs of the first part are snapped onto the one or more connectors of the second part to form a manifold.

In a further embodiment, each pin of the one or more pins may comprise a plurality of elongated grooves along the length of the pin and each pin of the one or more pins may be, for example, a quick release pin or a locking pin. In still a further embodiment, each tab of the one or more tabs may comprise a substantially rectangular body and may include an elongated slot that connects with the connector, and each tab of the one or more tabs may further comprise a flexible material.

In another embodiment, at least two tabs may connect with each other at a 90 degree angle connection and at least one pin may be located at the 90 degree angle connection. In still a further embodiment, at least two connectors may connect with each other at a 90 degree angle connection and at least one hole may be located at the 90 degree angle connection.

In yet another embodiment, each connector of the one or more connectors may have a substantially rectangular shape. In still a further embodiment, each connector of the one or more connectors may have an oblong shape.

In still another embodiment, the manifold may be a tee manifold. In yet another embodiment, the manifold may be an elbow manifold.

In another embodiment, a fastener for fastening at least two parts may comprise a plurality of brackets and an elongated back structure, wherein a first part of the at least two parts may connect to a second part of the at least two parts to form a manifold, wherein the one or more brackets may connect the first part and the second part, and wherein the elongated back structure may connect the first part and the second part.

In a further embodiment, each bracket of the one or more brackets may be L-shaped. In still a further embodiment, each bracket may further comprise a rail that may be elongated along a length of the bracket.

In still a further embodiment, each bracket may further comprise a one or more sliding sections, wherein each sliding section may slide along the rail. In a further embodiment, each sliding section of the one or more sliding sections may have a substantially rectangular shape. In another embodiment, each sliding section of the one or more sliding sections may have a trapezoidal shape.

In a further embodiment, the elongated back structure may further comprise an elongated rail that extends along a length of the elongated back structure. In still a further embodiment, the elongated back structure may further comprise one or more sliding sections, wherein each sliding section may slide along the rail. In a further embodiment, each sliding section of the one or more sliding sections may have a substantially rectangular shape. In another embodiment, each sliding section of the one or more sliding sections may have a trapezoidal shape.

In a further embodiment, a buttressing structure may connect the first part and the second part.

In another embodiment, a fastener for fastening at least two parts may comprise one or more pins and one or more tabs on a first part, one or more holes and one or more connectors on a second part, and an elongated back structure, wherein the one or more pins of the first part may be snapped onto the one or more holes of the second part and the one or more tabs of the first part may be snapped onto the one or more connectors of the second part to form a manifold, and wherein the elongated back structure may connect the first part and the second part.

In yet another embodiment, the fastener may further comprise one or more brackets wherein each bracket of the one or more brackets may form at the connection between the first part and the second part. In a further embodiment, each bracket of the one or more brackets may be L-shaped.

In a further embodiment, the elongated back structure may further comprise a pin that connects with a hole. In still a further embodiment, the elongated back structure may further comprise an elongated tab that connects with an elongated slot.

In still a further embodiment, a buttressing structure may connect the first part and the second part.

BRIEF DESCRIPTION OF DRAWING(S)

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the present invention.

DETAILED DESCRIPTION

Reference will now be made in detail to examples of embodiments, shown in the accompanying drawings.

Figure 1:
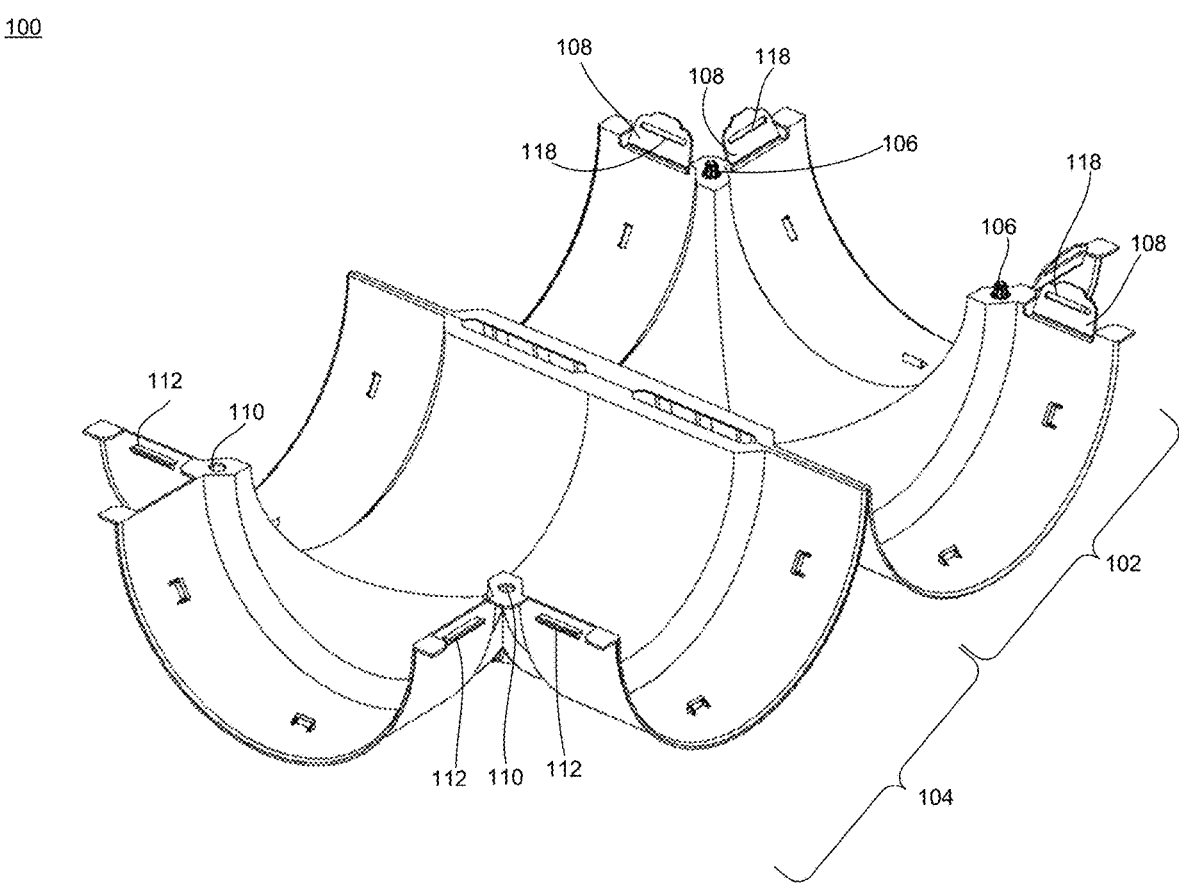
FIG. 1 illustrates a top view of a first embodiment of an example of a fastener and a manifold wherein the manifold is unconnected, consistent with disclosed embodiments.

FIG. 1 illustrates a top view of an embodiment of an example of fasteners and a manifold 100 wherein the manifold 100 is in an open, unconnected configuration, consistent with disclosed embodiments. The fasteners may be configured to fasten, connect, snap, snap-fit, and/or secure at least two parts 102, 104 to form the manifold 100. The formed manifold 100 may be an elbow manifold, an elbow fitting, an elbow joint, a bend fitting, a bend joint, a tee manifold, a T-junction, a T-piece, a T-fitting, a branch tree, or any other type of manifold. As seen in FIG. 1, the at least two parts 102, 104 comprise a first part 102 and a second part 104. The first part 102 and the second part 104 may be corrugated pipes. Alternatively, the first part 102 and the second part 104 may be PVC (polyvinyl chloride) pipes, HDPE (high-density polyethylene) pipes, metal pipes, clay pipes, concrete pipes, and/or any other type of pipe known in the art. Also, the first part 102 and the second part 104 need not be pipes but may comprise any two parts that require a connection to form the manifold 100.

As seen in FIG. 1, the fasteners may be used to connect, fit, secure, snap and/or snap-fit the first part 102 and the second part 104. As seen in FIG. 1, the fastener may further comprise a plurality of pins 106 and a plurality of tabs 108, wherein each pin 106 of the plurality of pins 106 and each tab 108 of the plurality of tabs 108 may be placed on the first part 102. Also, each pin 106 of the plurality of pins 106 may be a quick release pin or a locking pin that further comprises elongated grooves 116 along the length of the pin 106, which may be seen in greater detail in FIG. 6 and discussed below. Moreover, each tab 108 of the plurality of tabs 108 may be of a flexible material that comprises a substantially rectangular body that further comprises an elongated slot 118, which may be seen in greater detail in FIG. 5 and discussed below. The fastener may further comprise a plurality of holes 110 and a plurality of connectors 112, wherein each hole 110 of the plurality of holes 110 and each connector 112 of the plurality of connectors 112 may be placed on the second part 104. As may be further seen in FIG. 1, in some embodiments, each connector 112 of the plurality of connectors 112 may be a substantially rectangular body. Moreover, each connector 112 of the plurality of connectors 112 may also be an oblong shape, as need be. In some embodiments, holes 110 may be sockets configured to receive pins 106. In some embodiments, such sockets may be configured to retain pins 106 within the socket (not shown). In some embodiments, connectors 112 may be tabs configured to be inserted into elongated slots 118 and may be configured to be retained with elongate slots 118.

Each of the plurality of pins 106 and the plurality of tabs 108 may be placed on the first part 102 via adhesives, welding, soldering, brazing, interlocking, press fitting, and/ or any other suitable method of placement and/or connection. Similarly, each of the plurality of connectors 112 may be placed on the second part 104 via adhesives, welding, soldering, brazing, interlocking, press fitting, and/or any other suitable method of placement and/or connection. Moreover, each hole 110 of the plurality of holes 110 may be machined on the second part 104 via drilling, milling, reaming, broaching, a combination of the aforementioned machining processes, and/or any suitable machining process and/or technique(s), as need be.

When the aforementioned plurality of pins 106, plurality of tabs 108, and/or plurality of connectors 112 are placed via adhesives, the adhesives may range from water-based adhesives, solvent-based adhesives, epoxy adhesives, cyanoacrylate adhesives, silicone adhesives, polyurethane adhesives, pressure-sensitive adhesives, heat-activated adhesives, and/or a combination of one or more of the aforementioned adhesives. When the aforementioned plurality of pins 106, plurality of tabs 108, and/or plurality of connectors 112 are placed via welding, the welding technique(s) and/or process may range from arc welding, gas welding, resistance welding, laser welding, friction welding, ultrasonic welding, and/or a combination of one or more of the aforementioned welding technique(s) and/or processes.

When the aforementioned plurality of pins 106, plurality of tabs 108, and/or plurality of connectors 112 are placed via soldering, the soldering technique(s) and/or process may range from soft soldering, hard soldering, silver soldering, induction soldering, ultrasonic soldering, wave soldering, reflow soldering, and/or a combination of one or more of the aforementioned soldering technique(s) and/or processes. When the aforementioned plurality of pins 106, plurality of tabs 108, and/or plurality of connectors 112 are placed via brazing, the brazing technique(s) and/or process may range from torch brazing, manual brazing, induction brazing, vacuum brazing, and/or a combination of one or more of the aforementioned brazing technique(s) and/or processes. When the aforementioned plurality of pins 106, plurality of tabs 108, and/or plurality of connectors 112 are placed via interlocking, the interlocking technique(s) and/or process may range from a pin and cavity interlocking, a dovetail interlocking, a cantilever snap-fits interlocking, annual snap-fits, and/or a combination of the aforementioned interlocking technique(s) and/or processes.

As can be further seen in FIG. 1, at least two tabs 108 of the plurality of tabs 108 may connect with each other at a 90-degree angle connection. Moreover, a pin 106 may be located at the 90-degree angle connection. It is noted that in some embodiments, the aforementioned at least two tabs 108 may also connect with each other at an acute angle or an obtuse angle, as need be. As can be seen in FIG. 1, in some embodiments, first part 102 may include a first set of two tabs 108 with pin 106 located between the two tabs 108 at a 90-degree angle and a second set of two tabs 108 with pin 106 located between the two tabs 108 at a 90-degree angle.

Furthermore, as seen in FIG. 1, at least two connectors 112 may connect with each other at a 90-degree angle connection. Moreover, a hole 110 may be located at the 90-degree angle connection. As can be seen in FIG. 1, second part 104 may include a first set of two connectors 112 with hole 110 located between the two connectors 112 at a 90-degree angle and a second set of two connectors 112 with hole 110 located between the two connectors 112 at a 90-degree angle.

The user(s) and/or practitioner(s) may fit, secure, snap and/or snap-fit the first part 102 to the second part 104 by fitting, securing, snapping and/or snap-fitting each of the plurality of pins 106 of the first part 102 into each of the corresponding plurality of holes 110 of the second part 104. Simultaneously, the user(s) and/or practitioner(s) may also fit, secure, snap and/or snap-fit the first part 102 to the second part 104 by fitting, securing, snapping and/or snap-fitting each of the plurality of tabs 108 into each of the corresponding plurality of connectors 112 of the second part 104. This latter connection may take place by allowing the elongated slot 118 of each of the tabs 108 to interact with the corresponding connector 112. Moreover, in some embodiments tabs 108 may include a flexible material thereby permitting a snug fit as the material is able to bend and/or compress to accommodate the second part 104.

By connecting the first part 102 to the second part 104 as described above, the user(s) and/or practitioner(s) may form the manifold 100 in a manner that ensures a secure connection that minimizes leaking. Moreover, as per the structure of the embodiments of the fastener described above, manifold 100 may be formed by fitting first part 102 to second part 104 in a secure, snug, quick, effective, and facile manner. Also, as mentioned above, each pin 106 of the plurality of pins 106 may be a quick release pin. In some embodiments, the combination of pin 106 and tab 108 incorporating a flexible material may permit the easy and facile disconnection of first part 102 and second part 104 from each other to allow for cleaning, removal of debris, and/or maintenance of the manifold 100, as need be. While the manifold 100 and fastener embodiment depicted in FIG. 1 and described above includes a plurality of pins 106, tabs, 108, holes 110, elongated slots 118, and connectors 112, for example, embodiments having only a single pin, tab, hole, elongated slot, and connector are also contemplated. This disclosure is not intended to be limited to particular number of fastener features described with regards to each particular embodiment described herein or depicted in the figures.

Figure 2:
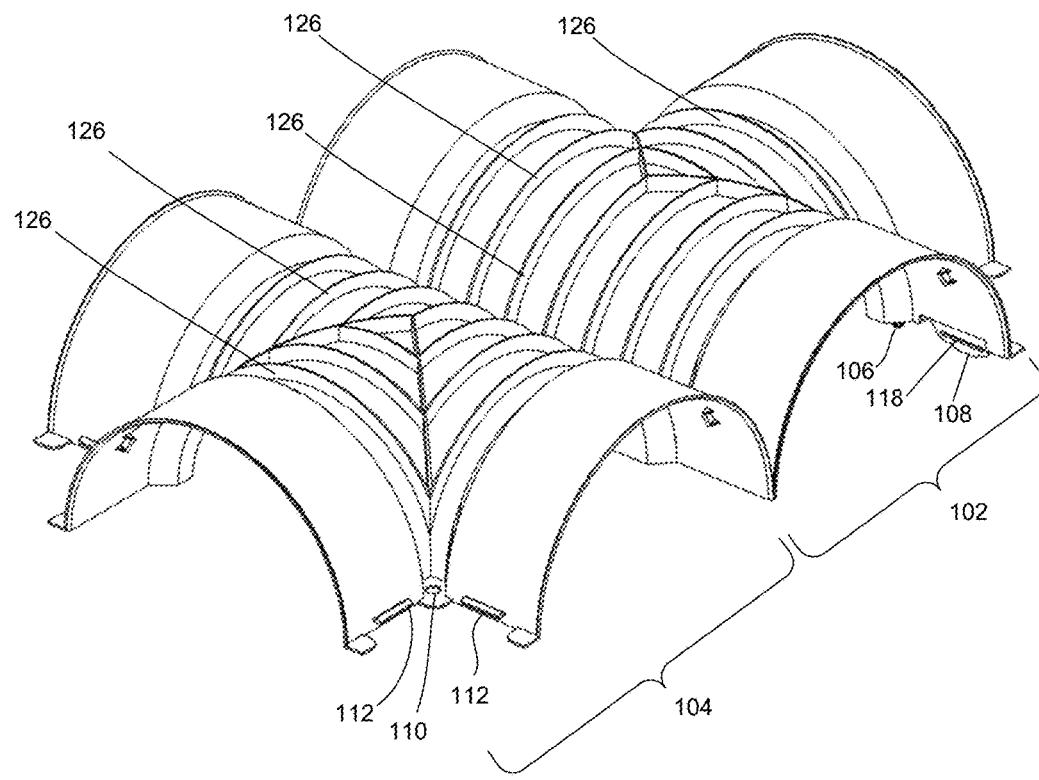
FIG. 2 illustrates a bottom view of the first embodiment of an example of a fastener and a manifold wherein the manifold is unconnected, consistent with disclosed embodiments.

FIG. 2 illustrates a bottom view of the embodiment of the fasteners and the manifold 100 depicted in FIG. 1, wherein manifold 100 is in an open, unconnected configuration, consistent with disclosed embodiments. As described above, the fasteners are configured to fasten, connect, snap, and/or secure first part 102 and second part 104 to form manifold 100. Similar to FIG. 1, FIG. 2 shows first part 102 and second part 104 In some embodiments, manifold 100 may comprise more than two parts (not shown). As seen in FIG. 2, first part 102 may comprise one or more tabs 108 along with their respective elongated slots 118. Moreover, first part 102 may further comprise pin 106. Furthermore, as shown in FIG. 2, second part 104 may comprise hole 110 and one or more connectors 112. Furthermore, both first part 102 and second part 104 may comprise a plurality of buttressing structures 126, which may be, for example, ribs or rib-like features that provide structural support for the manifold 100. The plurality of buttressing structures 126 may be formed on the external surfaces of each of first part 102 and second part 104.

Figure 3:
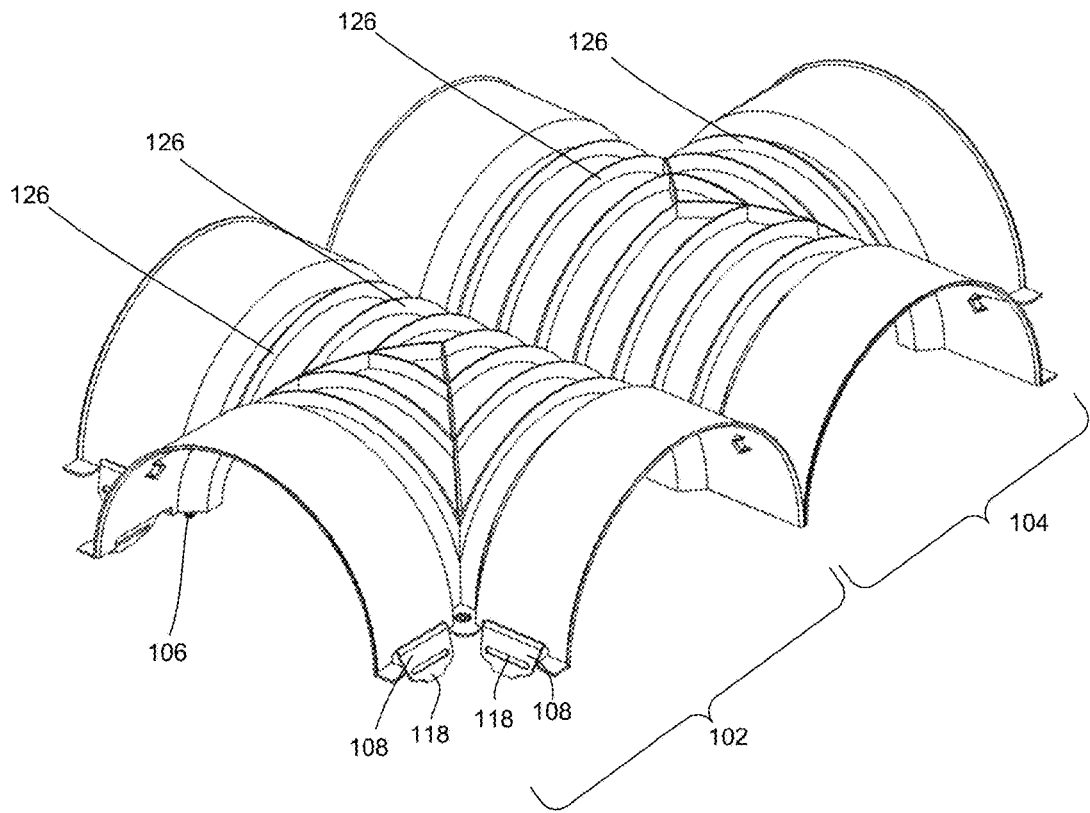
FIG. 3 illustrates a bottom view of the first embodiment of an example of a fastener and a manifold wherein the manifold is unconnected, consistent with disclosed embodiments.

FIG. 3 illustrates a bottom view of the embodiment of the fasteners and the manifold 100, depicted in FIGS. 1 and 2, wherein manifold 100 is in an open, unconnected configuration, consistent with disclosed embodiments. In fact, FIG. 3 depicts manifold 100 of FIG. 2 rotated 180 degrees. As described above, the fasteners are configured to fasten, connect, snap, and/or secure first part 102 and second part 104 together to form manifold 100. Similar to FIG. 2, FIG. 3 shows first part 102 and second part 104. As seen in FIG. 3, first part 102 comprises tabs 108 along with their respective elongated slots 118. Moreover, first part 102 further comprises one or more pin 106. Also, the aforementioned plurality of buttressing structures 126 that provide structural support for manifold 100 are also depicted in FIG. 3. As mentioned above, these plurality of buttressing structures 126 may be formed on the external surfaces of each of first part 102 and second part 104.

Figure 4:
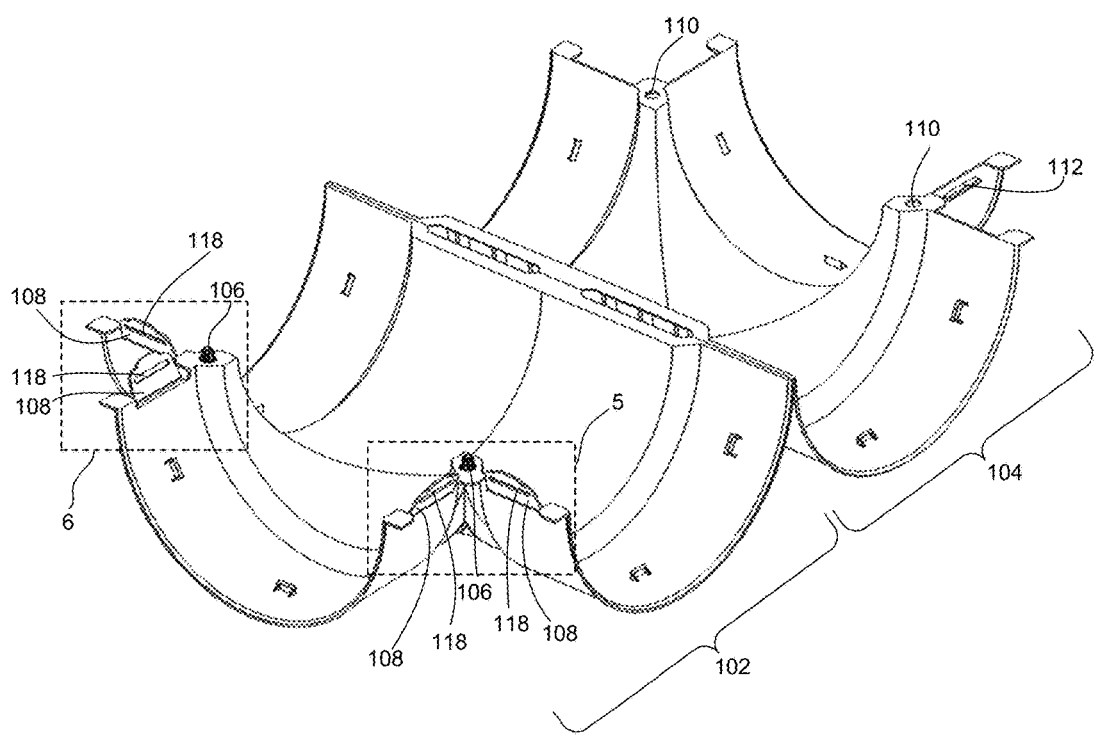
FIG. 4 illustrates a top view of the first embodiment of an example of a fastener and a manifold wherein the manifold is unconnected, consistent with disclosed embodiments.

FIG. 4 illustrates a top view of the embodiment 100 of the fasteners and the manifold 100 depicted in FIGS. 1-3, wherein the manifold 100 is in an open, unconnected configuration, consistent with disclosed embodiments. In fact, FIG. 3 depicts manifold 100 of FIG. 1 rotated 180 degrees. The fasteners are configured to fasten, connect, snap, and/or secure first part 102 and second part 104 to form manifold 100. As seen in FIG. 4, first part 102 further comprises a plurality of pins 106, wherein each pin 106 of the plurality of pins 106 further comprises a plurality of elongated grooves 116 along its length. Such details of pin 106 and its respective plurality of elongated grooves 116 may be seen in detail in FIG. 6 and discussed below, wherein FIG. 6 illustrates a closer view of the region 6 of the fasteners and manifold 100 shown in FIG. 4.

Figure 5:
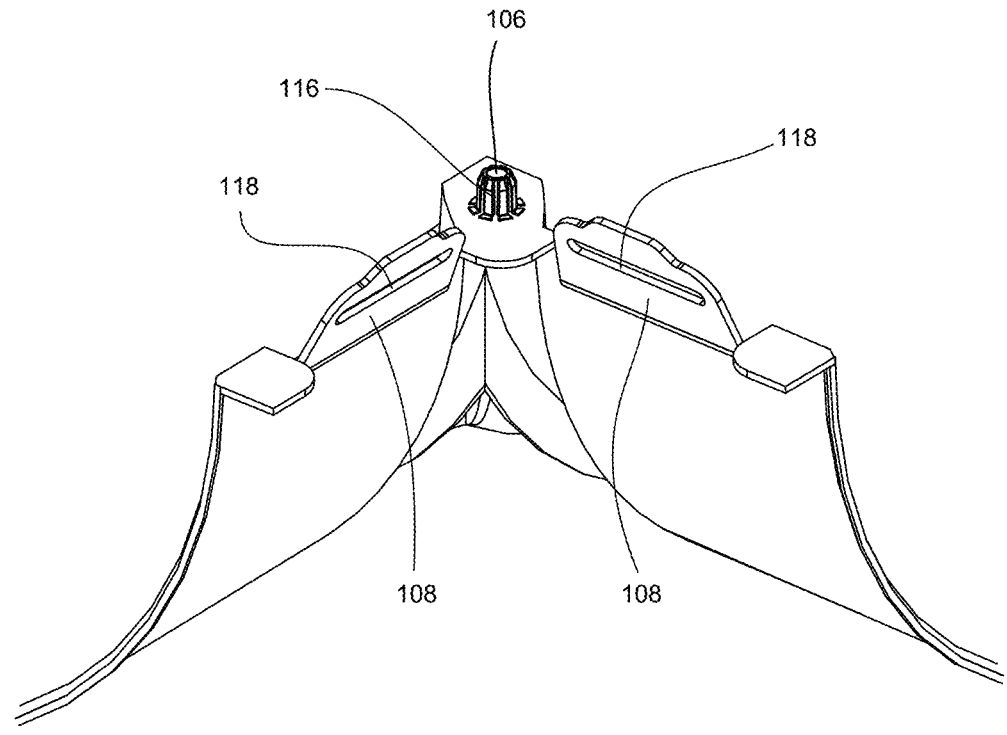
FIG. 5 illustrates a closer view of a region of the example fastener and a manifold, consistent with disclosed embodiments.

Moreover, as seen in FIG. 4, first part 102 further comprises a plurality of tabs 108, wherein each tab 108 of the plurality of tabs 108 further comprises an elongated slot 118. Such details of the plurality of tabs 108 and the respective elongated slots 118 may be seen in detail in each of FIGS. 5 and 6 and discussed below, wherein FIG. 5 illustrates a closer view of the region 5 of the fasteners and manifold 100 shown in FIG. 4. Also, FIG. 4 illustrates second part 104, wherein second part 104 further comprises a plurality of holes 110 and a connector 112.

FIG. 5 illustrates a closer view of the region 5 of the fasteners and manifold 100 shown in FIG. 4. Specifically, FIG. 5 illustrates pin 106, wherein pin 106 further comprises a plurality of elongated grooves 116 extending in a vertical direction along a height of pin 106. Moreover, FIG. 5 illustrates the plurality of tabs 108 wherein each tab 108 of the plurality of tabs 108 further comprises an elongated slot 118. Furthermore, each tab 108 of the plurality of tabs 108 may include a flexible material and/or a flexible plastic that comprises a substantially rectangular body. In some embodiments, each tab 108 of the plurality of tabs 108 may be made exclusively of a flexible material and/or a flexible plastic. Each tab 108 may be manufactured via molding (injection molding, blow molding, rotational molding, etc.), forming (thermoforming, roll forming, etc.), forging, stamping, casting, subtractive machining, extruding, 3D printing, and/or a combination of the aforementioned manufacturing methods, as appropriate. The structure, material, and material formation of each tab 108 shown in FIG. 5 may apply to the aforementioned plurality of tabs 108.

Figure 6:
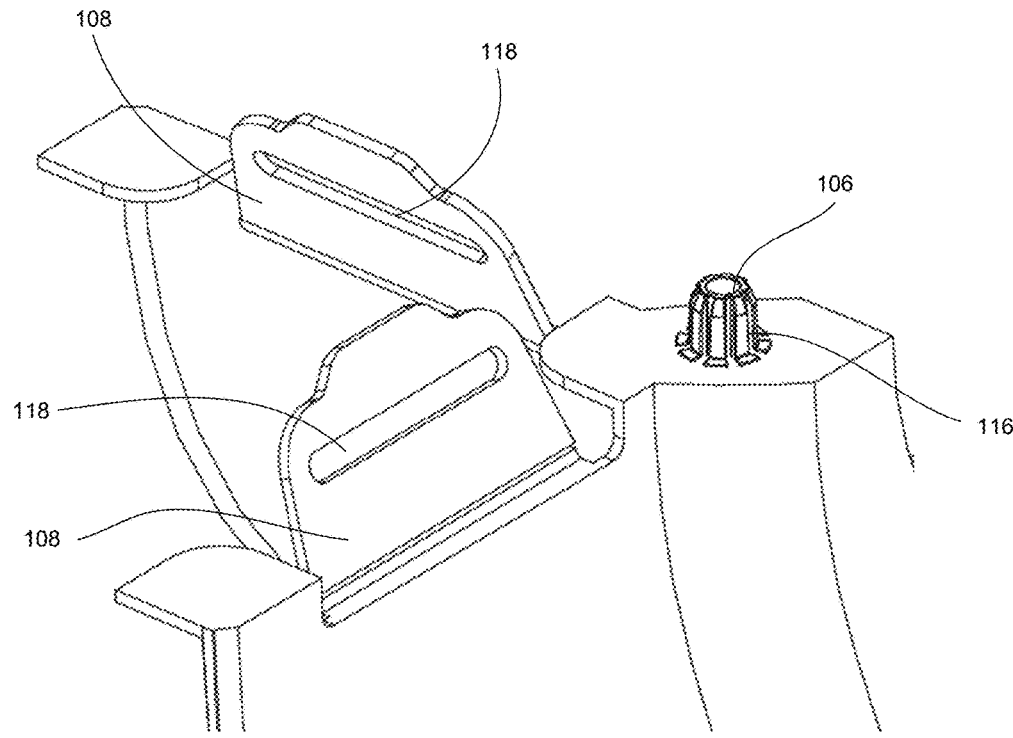
FIG. 6 illustrates a closer view of a region of the example fastener and a manifold, consistent with disclosed embodiments.

FIG. 6 illustrates a closer view of the region 6 of the fasteners and manifold 100 shown in FIG. 4. Specifically, FIG. 6 illustrates pin 106, wherein pin 106 further comprises a plurality of elongated grooves 116 extending in a vertical direction along a height of pin 106. Moreover, pin 106 may be a quick release pin or a locking pin, as need be. Furthermore, each pin 106 of the plurality of pins 106 may include a flexible material and/or a flexible plastic. In some embodiments, each pin 106 of the plurality of pins 106 may be made exclusively of a flexible material and/or a flexible plastic. Each pin 106 may be manufactured via molding (injection molding, blow molding, rotational molding, etc.), forming (thermoforming, roll forming, etc.), forging, stamping, casting, subtractive machining, extruding, 3D printing, and/or a combination of the aforementioned manufacturing methods, as appropriate. The structure, material, and material formation of each pin 106 shown in FIG. 6 may apply to the aforementioned plurality of pins 106.

Indeed, manifold 100 and associated fasteners of FIGS. 1-6 may be manufactured from various materials, including metal, plastic, rubber, cast iron, brass, bronze, composite materials, and/or a combination of one or more of the aforementioned materials. Moreover, the manifold 100 and associated fasteners may be manufactured via molding (injection molding, blow molding, rotational molding, etc.), forming (thermoforming, roll forming, etc.), forging, casting, subtractive machining, stamping, extruding, 3D printing, and/or a combination of the aforementioned manufacturing methods, as appropriate.

Figure 7:
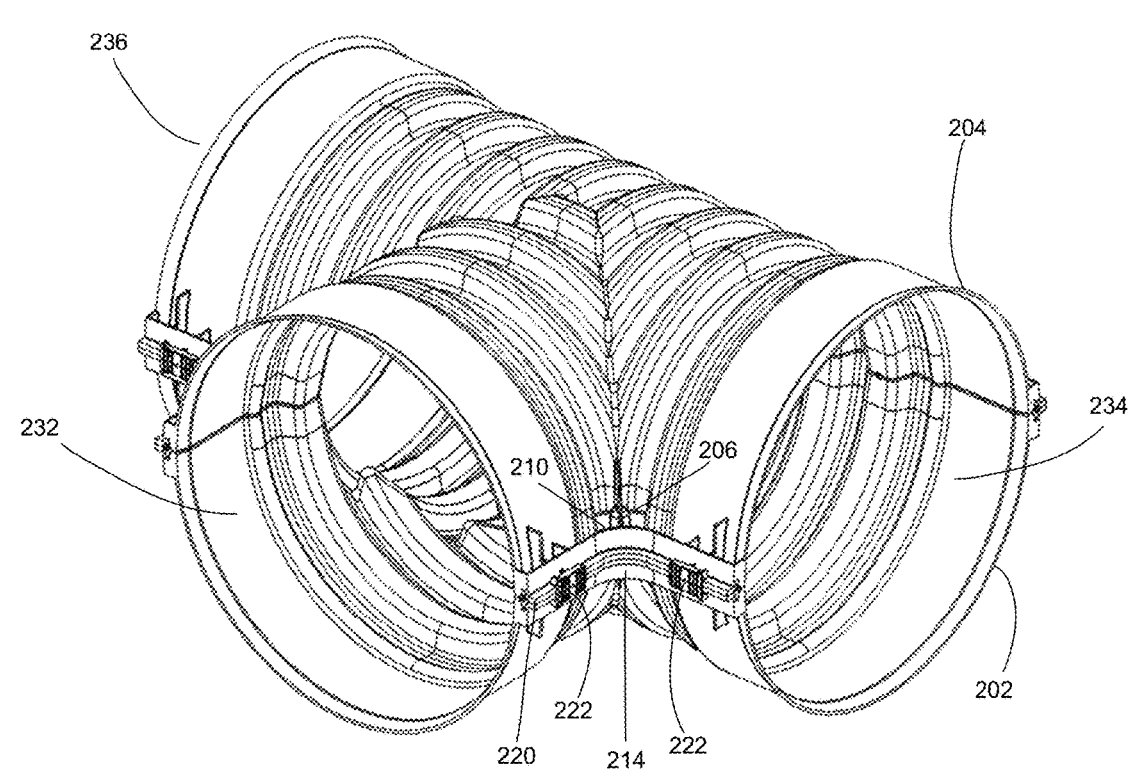
FIG. 7 illustrates a perspective front view of a second embodiment of an example fastener and a manifold wherein the manifold is connected, consistent with disclosed embodiments.

FIG. 7 illustrates a perspective front view of an embodiment 200 of a manifold 200 and fasteners, wherein manifold 200 is in a closed, connected configuration, consistent with disclosed embodiments. The fasteners are configured to fasten, connect, snap, snap-fit, and/or secure at least first part 202 and second part 204 to form manifold 200. The formed manifold 200 may be an elbow manifold, an elbow fitting, an elbow joint, a bend fitting, a bend joint, a tee manifold, a T-junction, a T-piece, a T-fitting, a branch tree or any other type of manifold. As depicted in FIG. 7, manifold 200 may include first opening 232, second opening 234, and third opening 236, each opening being configured to receive a pipe, including, for example, corrugated pipe, PVC (polyvinyl chloride) pipe, HDPE (high-density polyethylene) pipe, metal pipe, clay pipe, and/or concrete pipe, as need be. As seen in FIG. 7, first part 202 and second part 204 may include corrugations on their inner and outer surfaces. In some embodiments, first part 202 and second part 204 may be made of PVC (polyvinyl chloride), HDPE (high-density polyethylene), metal, clay, and/or concrete, as need be. In some embodiments, first part 202 and second part 204 may include portions of PVC (polyvinyl chloride) pipes, HDPE (high-density polyethylene) pipes, metal pipes, clay pipes, and/or concrete pipes, as need be. In some embodiments, first part 202 and second part 204 need not be pipes but may comprise any two parts that require a connection to form manifold 200.

As seen in FIG. 7, the user(s) and or practitioner(s) may utilize the fasteners to connect, fit, secure, snap and/or snap-fit first part 202 and second part 204. As further seen in FIG. 7, the fasteners may further comprise a plurality of pins 206 in first part 202, a plurality holes in second part 204, a plurality of L-shaped brackets 214, a plurality of rails 220, and a plurality of sliding sections 222 wherein each sliding section 222 of the plurality of sliding sections 222 has a substantially rectangular shape. As can be seen in FIG. 7, pin 206 of first part 202 may be configured to fasten, connect, snap, and/or snap-fit to hole 210 of second part 204 to ensure a safe and secure connection.

FIG. 7 shows the entirety of a first L-shaped bracket 214 of the plurality of L-shaped brackets 214. A portion of a second L-shaped bracket 214 is depicted on the left side of FIG. 7, however, the embodiment depicted in FIG. 7 includes a second L-shaped bracket 214 identical to first L-shaped bracket on the opposite side of first opening 232. As can be seen in FIG. 7, the L-shaped bracket 214 further comprises a rail 220 and a plurality of sliding sections 222. As can be further seen in FIG. 7, the rail 220 is elongated along a length of the L-shaped bracket 214. Each of the plurality of sliding sections 222 may move and/or slide along and/or upon rail 220. Indeed, the user(s) and/or practitioner(s) may utilize each of the sliding sections 222 to ensure that the connection between first part 202 and second part 204 may be a secure and will be configured to minimize leaking, thereby forming a structurally-sound manifold 200. Moreover, the user(s) and/or practitioner(s) may, in a facile, effective, and efficient manner, move first part 202 and second part 204 close toward each other and/or in proximity to one another to connect, snap, and/or snap-fit with one another to form manifold 200. Thereafter, the user(s) and/or practitioner may move each of the sliding sections 222 along the rail 220 appropriately to ensure a secure connection between first part 202 and second part 204. In this manner, L-shaped bracket 214 connects first part 202 and second part 204 in a secure connection that minimizes leaking, thereby forming a structurally-sound manifold 200.

Figure 8:
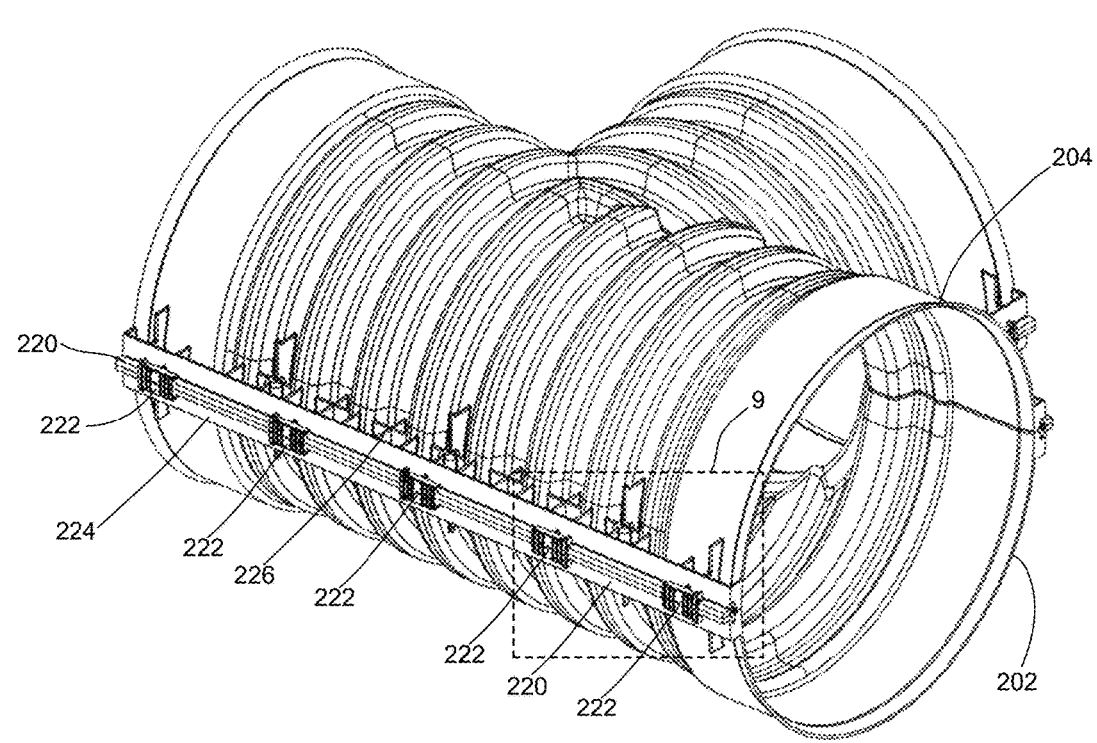
FIG. 8 illustrates a perspective back view of the second embodiment of an example fastener and a manifold wherein the manifold is connected, consistent with disclosed embodiments.

FIG. 8 illustrates a perspective back view of the embodiment of manifold 200 and fasteners depicted in FIG. 7, wherein manifold 200 is in a closed, connected configuration, consistent with disclosed embodiments. As seen in FIG. 8, the user(s) and or practitioner(s) may utilize the fasteners to connect, fit, secure, snap and/or snap-fit first part 202 and second part 204. As further seen in FIG. 8, the fasteners further comprise an elongated back structure 224, an elongated rail 220 extending along the elongated back structure 224, a plurality of sliding sections 222 each having a substantially rectangular shape, and a plurality of buttressing structures 226.

As further seen in FIG. 8, each of the plurality of sliding sections 222 may be configured to move and/or slide along and/or upon rail 220. Indeed, the user(s) and/or practitioner(s) may utilize each of the sliding sections 222 to ensure that the connection between first part 202 and second part 204 may be secure and will minimize leaking, thereby forming a structurally-sound manifold 200. Moreover, the user(s) and/or practitioner(s) may, in a facile, effective, and efficient manner, move first part 202 and second part 204 close to each other and/or in proximity to one another to connect, snap, and/or snap-fit with one another thereby forming manifold 200. Thereafter, the user(s) and/or practitioner may move each of the sliding sections 222 along the rail 220 appropriately to ensure a secure and sound connection between the first part 202 and second part 204. In this manner, the elongated back structure 224 connects first part 202 and second part 204 in a secure and sound connection with minimal leaking, thereby forming a structurally-sound manifold 200.

Also, as seen in FIG. 8, buttressing structures 226 may also connect first part 202 and second part 204. Moreover, buttressing structures 226 further support the connection between first part 202 and second part 204, thereby resulting in a secure connection between the first part 202 and second part 204 and forming a structurally-sound manifold 200. Moreover, such structural details of the aforementioned elongated back structure 224, elongated rail 220, plurality of sliding sections 222, and the buttressing structures 226 may be seen in FIG. 9, wherein FIG. 9 illustrates a closer view of the region 9 of the fastener and manifold 200 shown in FIG. 8.

Figure 9:
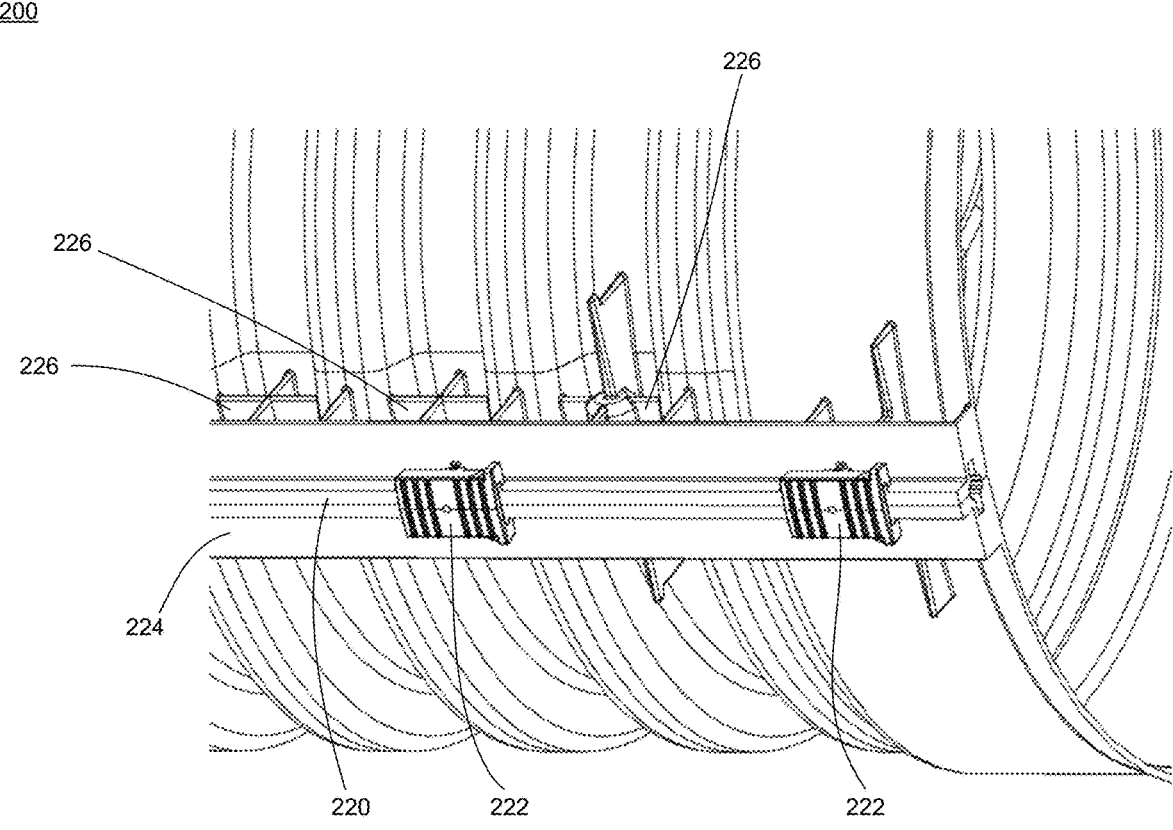
FIG. 9 illustrates a closer view of a region of the example fastener and a manifold, consistent with disclosed embodiments.

As indicated above, FIG. 9 illustrates a closer view of the region 9 of the manifold 200 and fasteners shown in FIG. 8, consistent with disclosed embodiments. Specifically, FIG. 9 illustrates the aforementioned elongated back structure 224, the elongated rail 220 extending along the elongated back structure 224, the plurality of sliding sections 222 each having a substantially rectangular shape and being configured to slide/move along the rail 220, and the buttressing structures 226. As mentioned above, each of these aforementioned structure(s) of the fastener play a vital role in ensuring a secure and sound connection between first part 202 and second part 204, thereby forming a structurally-sound manifold 200.

Indeed, manifold 200 and associated fasteners of FIGS. 7-9 may be manufactured from various materials, including metal, plastic, rubber, cast iron, brass, bronze, composite materials, and/or a combination of one or more of the aforementioned materials. Moreover, manifold 200 and associated fasteners may be manufactured via molding (injection molding, blow molding, rotational molding, etc.), forming (thermoforming, roll forming, etc.), forging, casting, subtractive machining, stamping, extruding, 3D printing, and/or a combination of the aforementioned manufacturing methods, as appropriate.

Figure 10:
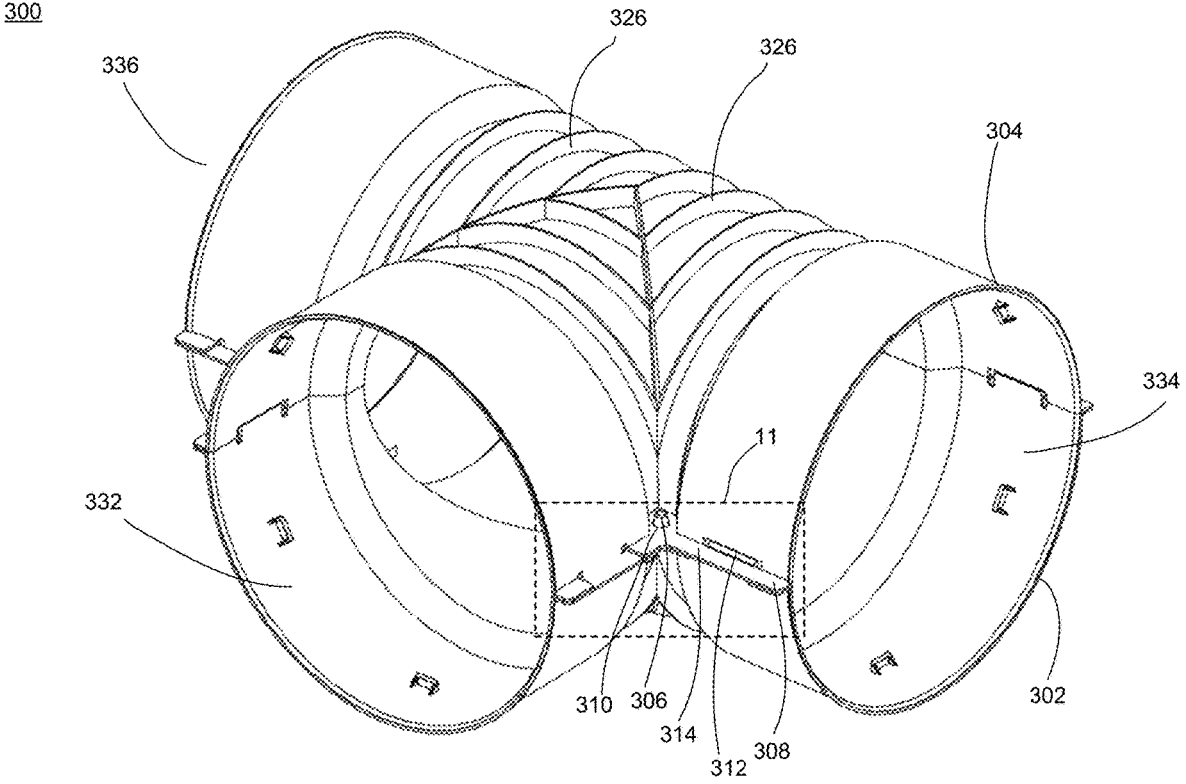
FIG. 10 illustrates a perspective front view of a third embodiment of an example fastener and a manifold wherein the manifold is connected, consistent with disclosed embodiments.

FIG. 10 illustrates a perspective view of an embodiment of a manifold 300 and fasteners, wherein manifold 300 is in a closed, connected configuration, consistent with disclosed embodiments. The fasteners may be configured to fasten, connect, snap, snap-fit, and/or secure at least first part 302 and second part 304 to form manifold 300. The formed manifold 300 may be an elbow manifold, an elbow fitting, an elbow joint, a bend fitting, a bend joint, a tee manifold, a T-junction, a T-piece, a T-fitting, a branch tree or any other type of manifold. In some embodiments, first part 302 and second part 304 may include portions of corrugated pipes. In some embodiments, first part 302 and second part 304 may include portions of PVC (polyvinyl chloride) pipes, HDPE (high-density polyethylene) pipes, metal pipes, clay pipes, and/or concrete pipes, as need be. As depicted in FIG. 10, manifold 300 may include first opening 332, second opening 334, and third opening 336, each opening being configured to receive a pipe, including, for example, corrugated pipe, PVC (polyvinyl chloride) pipe, HDPE (high-density polyethylene) pipe, metal pipe, clay pipe, and/or concrete pipe, as need be. Also, first part 302 and second part 304 need not be pipes but may comprise any two parts that require a connection to form the manifold 300. Moreover, first part 302 and second part 304 may be made from one or more of PVC, HDPE, metal, clay, and/or concrete, as need be. Furthermore, both first part 302 and second part 304 may comprise a plurality of buttressing structures 326, which may be, for example, ribs or rib-like features that provide structural support for manifold 300. These plurality of buttressing structures 326 may be formed on the external surfaces of each of first part 302 and second part 304.

As seen in FIG. 10, the user(s) and or practitioner(s) may utilize the fasteners to connect, fit, secure, snap and/or snap-fit first part 302 and second part 304. As seen in FIG. 10, the fasteners may further comprise a plurality of L-shaped brackets 314, a plurality of pins 306 on first part 302, a plurality of holes 310 on second part 304, a plurality of tabs 308 on first part 302, and a plurality of connectors 312 on second part 304.

Note that the plurality of pins 306 correlate to the aforementioned plurality of pins 106, as depicted in FIGS. 1-6; therefore, all the structural detail(s) and/or feature(s) pertaining to each pin 106 of the plurality of pins 106 as discussed above applies also to each pin 306 of the plurality of pins 306 of manifold 300 and its accompanying fasteners. In a similar manner, the plurality of holes 310 correlate to the aforementioned plurality of holes 110 and so all the structural detail(s) and/or feature(s) pertaining to each hole 110 of the plurality of holes 110 as discussed above applies also to each hole/socket 310 of the plurality of holes 310 of manifold 300 and its accompanying fasteners. Similarly, the plurality of tabs 308 correlate to the aforementioned plurality of tabs 108; therefore, all the structural detail(s) and/or feature(s) pertaining to each tab 108 of the plurality of tabs 108 as discussed above applies also to each tab 308 of the plurality of tabs 308 of the manifold 300 and its accompanying fasteners. Also, the plurality of connectors 312 correlate to the aforementioned plurality of connectors 112; therefore, all the structural detail(s) and/or feature(s) pertaining to each connector 112 of the plurality of connectors 112 as discussed above applies also to each connector 312 of the plurality of connectors 312 of manifold 300 and its accompanying fasteners.

FIG. 10 depicts the entirety of a first L-shaped bracket 314 of the plurality of L-shaped brackets 314. A portion of a second L-shaped bracket 314 is depicted on the left side of FIG. 10. The embodiment of manifold 300 depicted in FIG. 10, however, includes a second L-shaped bracket 314 identical to the first L-shaped bracket on the opposite side of first opening 332. As can be seen in FIG. 10, L-shaped brackets 314 allow for the safe and secure connection between first part 302 and second part 304 via the use of the aforementioned pin 306, hole 310, tab 308, and connector 312. Specifically, the user(s) and/or practitioner(s) may fit, secure, snap and/or snap-fit first part 302 to second part 304 by fitting, securing, snapping and/or snap-fitting each of the plurality of pins 306 of first part 302 into each of the corresponding plurality of holes 310 of the second part 304. Simultaneously, the user(s) and/or practitioner(s) may also fit, secure, snap and/or snap-fit first part 302 to second part 304 by fitting, securing, snapping and/or snap-fitting each of the plurality of tabs 308 into each of the corresponding plurality of connectors 312 of second part 304. This latter connection may take place by allowing the elongated slot 318 of each of the tabs 308 to interact with the corresponding connector 312. Moreover, each of tabs 308 may include a flexible material permitting for a snug fit as the material is able to bend and/or compress to accommodate second part 304. In this manner, the L-shaped brackets 314 connect first part 302 and second part 304 in a secure connection that minimizes leaking, thereby forming a structurally-sound manifold 300. Furthermore, the structural details pertaining to the aforementioned pin 306, hole 310, tab 308, and connector 312 may be seen in FIG. 11, wherein FIG. 11 illustrates a closer view of the region 11 of the fasteners and manifold 300 shown in FIG. 10.

Figure 11:
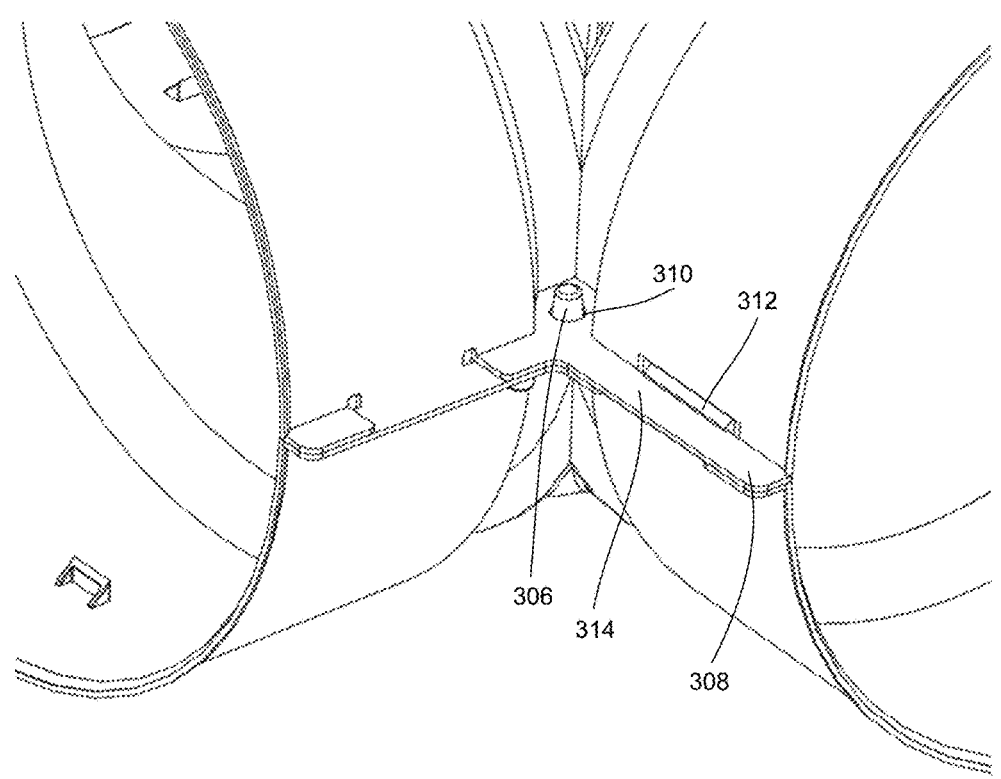
FIG. 11 illustrates a closer view of a region of the example fastener and a manifold, consistent with disclosed embodiments.

FIG. 11 illustrates a closer view of the region 11 of the embodiment of manifold 300 and fasteners shown in FIG. 10, consistent with disclosed embodiments. Specifically, FIG. 11 illustrates the aforementioned elongated pin 306, hole 310, tab 308, connector 312, and L-shaped bracket 314. As mentioned above, each of these aforementioned structure(s) of the fasteners play a vital role in ensuring a secure and sound connection between the first part 302 and second part 304, thereby forming a structurally-sound manifold 300.

Figure 12:
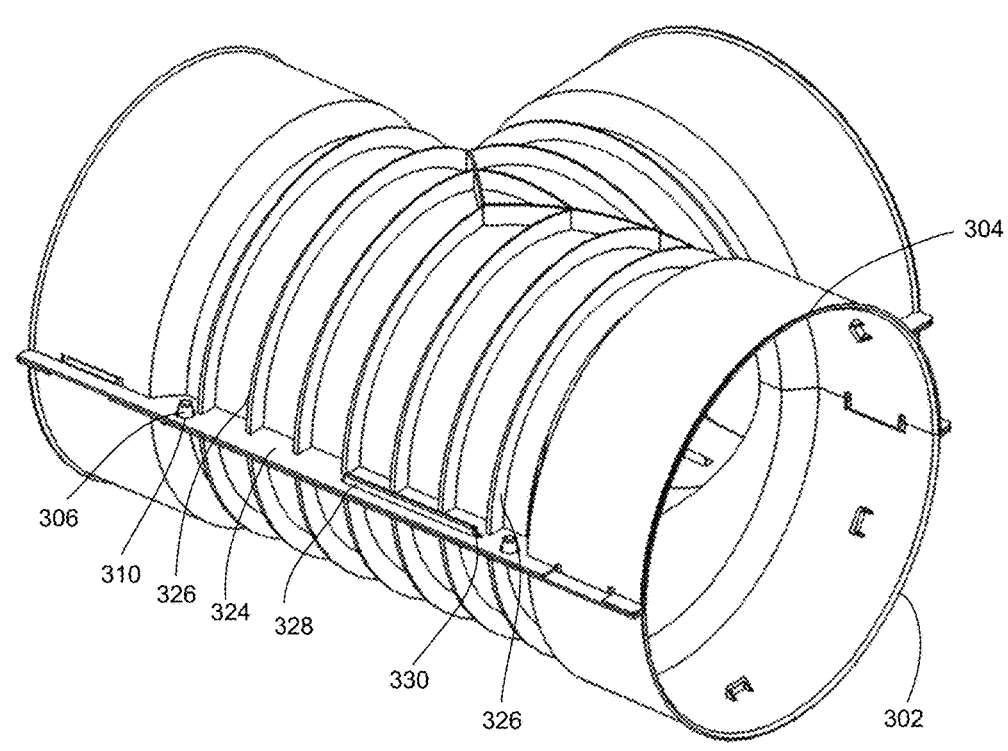
FIG. 12 illustrates a perspective back view of the third embodiment of an example fastener and a manifold wherein the manifold is connected, consistent with disclosed embodiments.

FIG. 12 illustrates a perspective back view of the embodiment of manifold 300 and fasteners depicted in FIG. 10, wherein manifold 300 is in a closed, connected configuration, consistent with disclosed embodiments. As seen in FIG. 12, the user(s) and or practitioner(s) may utilize the fasteners to connect, fit, secure, snap and/or snap-fit first part 302 and second part 304. As further seen in FIG. 12, the fasteners may further comprise a plurality of pins 306 in first part 302, a plurality holes 310 on second part 304, an elongated back structure 324, buttressing structures 326, an elongated tab 328 on first part 302, and an elongated slot 330 on second part 304. It is noted that each of the elongated tab 328 and the elongated slot 330 may also comprise a part of the elongated back structure 324, as seen in FIG. 12.

As further seen in FIG. 12, the user(s) and/or practitioner(s) may fit, secure, snap and/or snap-fit first part 302 to second part 304 by fitting, securing, snapping and/or snap-fitting each of the plurality of pins 306 of first part 302 into each of the corresponding plurality of holes 310 of second part 304. Moreover, the user(s) and/or practitioner(s) may also fit, secure, snap and/or snap-fit first part 302 to second part 304 by fitting, securing, snapping and/or snap-fitting the aforementioned elongated tab 328 of either first part 302 and/or the elongated back structure 324 to the elongated slot 330 of either second part 304 and/or the elongated back structure 324. In this manner, the elongated back structure 324 connects first part 302 and second part 304 in a secure connection that minimizes leaking, thereby forming a structurally-sound manifold 300.

Also, as seen in FIG. 12, the buttressing structures 326 may also connect first part 302 and second part 304. Moreover, the buttressing structures 326 further support the connection between first part 302 and second part 304, thereby resulting in a secure connection between first part 302 and second part 304 and forming a structurally-sound manifold 300.

Indeed, manifold 300 and associated fasteners of FIGS. 10-12 may be manufactured from various materials, including metal, plastic, rubber, cast iron, brass, bronze, composite materials, and/or a combination of one or more of the aforementioned materials. Moreover, the manifold 300 and associated fasteners may be manufactured via molding (injection molding, blow molding, rotational molding, etc.), forming (thermoforming, roll forming, etc.), forging, casting, subtractive machining, stamping, extruding, 3D printing, and/or a combination of the aforementioned manufacturing methods, as appropriate.

Figure 13:
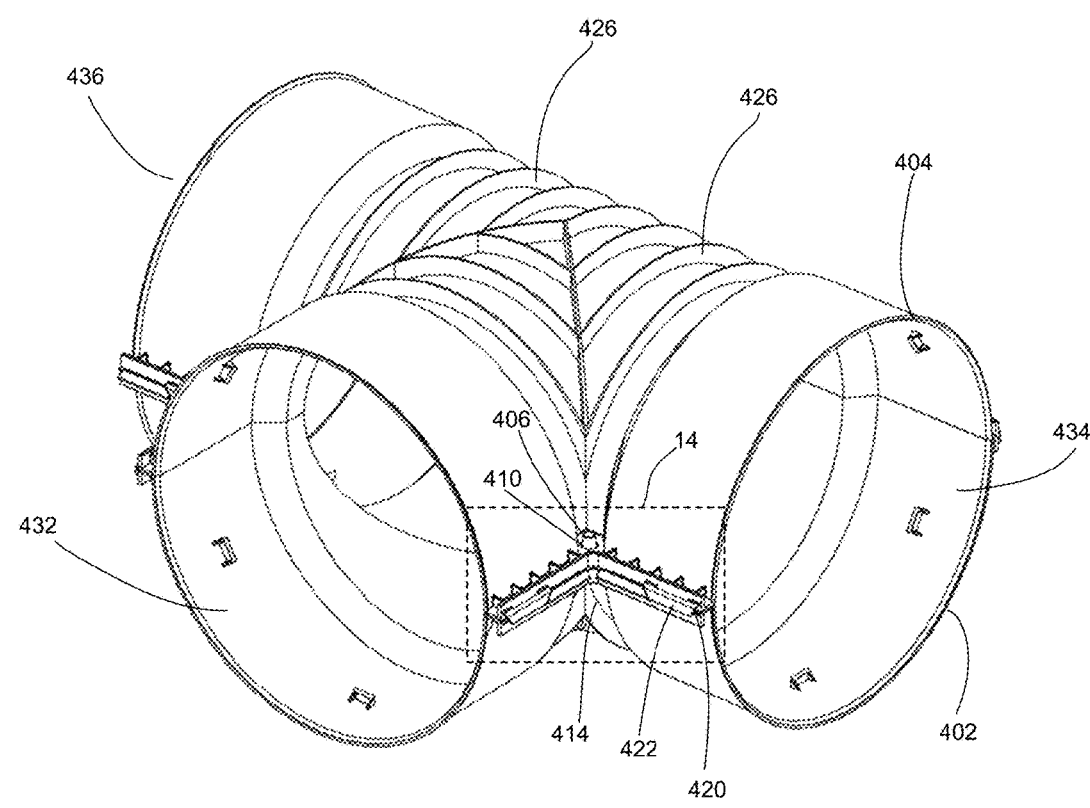
FIG. 13 illustrates a perspective front view of a fourth embodiment of an example fastener and a manifold wherein the manifold is connected, consistent with disclosed embodiments.

FIG. 13 illustrates a perspective front view of an embodiment of manifold 400 and fasteners, wherein manifold 400 is in a closed, connected configuration, consistent with disclosed embodiments. The fasteners may be configured to fasten, connect, snap, snap-fit, and/or secure at least first part 402 and second part 404 to form manifold 400. The formed manifold 400 may be an elbow manifold, an elbow fitting, an elbow joint, a bend fitting, a bend joint, a tee manifold, a T-junction, a T-piece, a T-fitting, a branch tree or any other type of manifold. In some embodiments, first part 402 and second part 404 may include portions of corrugated pipes. Alternatively, in some embodiments, first part 402 and second part 404 may include portions of PVC (polyvinyl chloride) pipes, HDPE (high-density polyethylene) pipes, metal pipes, clay pipes, and/or concrete pipes, as need be. As depicted in FIG. 13, manifold 400 may include first opening 432, second opening 434, and third opening 436, each opening being configured to receive a pipe, including, for example, corrugated pipe, PVC (polyvinyl chloride) pipe, HDPE (high-density polyethylene) pipe, metal pipe, clay pipe, and/or concrete pipe, as need be. Also, first part 402 and second part 404 need not be pipes but may comprise any two parts that require a connection to form manifold 400. Furthermore, both first part 402 and second part 404 may comprise a plurality of buttressing structures 426, which may be, for example, ribs or rib-like features that provide structural support for manifold 400. These plurality of buttressing structures 426 may be formed on the external surfaces of each of first part 402 and second part 404.

As seen in FIG. 13, the user(s) and or practitioner(s) may utilize the fasteners to connect, fit, secure, snap and/or snap-fit first part 402 and second part 404. As further seen in FIG. 13, the fasteners may further comprise a plurality of pins 406 in first part 402, a plurality holes 410 in second part

404, a plurality of L-shaped brackets 414, a plurality of rails 420, and a plurality of sliding sections 422 each having a trapezoidal shape. As can be seen in FIG. 13, pin 406 of first part 402 fastens, connects, snaps, and/or snap-fits to the hole 410 of second part 404 to ensure a safe and secure connection.

Note that the plurality of pins 406 correlates to the aforementioned plurality of pins 106; therefore, all the structural detail(s) and/or feature(s) pertaining to each pin 106 of the plurality of pins 106 as discussed above applies also to each pin 406 of the plurality of pins 406 of manifold 400 and its accompanying fasteners. In a similar manner, the plurality of holes 410 and correlate to the aforementioned plurality of holes 110 and so all the structural detail(s) and/or feature(s) pertaining to each hole 110 of the plurality of holes 110 as discussed above applies also to each hole 410 of the plurality of holes 410 of manifold 400 and its accompanying fasteners.

FIG. 13 further shows the entirety of a first L-shaped bracket 414 of the plurality of L-shaped brackets 414. A portion of a second L-shaped bracket 414 is shown on the left side of FIG. 13. The embodiment of manifold 400 depicted in FIG. 13, however, includes a second L-shaped bracket 314 identical to the first L-shaped bracket on the opposite side of first opening 432. As can be seen in FIG. 13, the L-shaped bracket 414 further comprises a rail 420 and a plurality of trapezoidal sliding sections 422. As can be further seen in FIG. 13, the rail 420 is an elongated rail along the length of the L-shaped bracket 414. Each of the plurality of trapezoidal sliding sections 422 may move and/or slide along and/or upon the rail 420. Indeed, the user(s) and/or practitioner(s) may utilize each of the trapezoidal sliding sections 422 to ensure that the connection between first part 402 and second part 404 may be a secure connection that minimizes leaking, thereby forming a structurally-sound manifold 400.

Moreover, the user(s) and/or practitioner(s) may, in a facile, effective, and efficient manner, move first part 402 and second part 404 close to each other and/or in proximity to one another to connect, snap, and/or snap-fit with one another. Thereafter, the user(s) and/or practitioner may move each of the trapezoidal sliding sections 422 along the rail 420 appropriately to ensure a secure connection between first part 402 and second part 404. In this manner, the L-shaped bracket 414 connects first part 402 and second part 404 in a secure connection that minimizes leaking, thereby forming a structurally-sound manifold 400. Furthermore, the structural details pertaining to the aforementioned L-shaped bracket 414, the rail 420, and the trapezoidal sliding sections 422 may be seen in FIG. 14, wherein FIG. 14 illustrates a closer view of the region 14 of the fastener and manifold 400 shown in FIG. 13.

Figure 14:
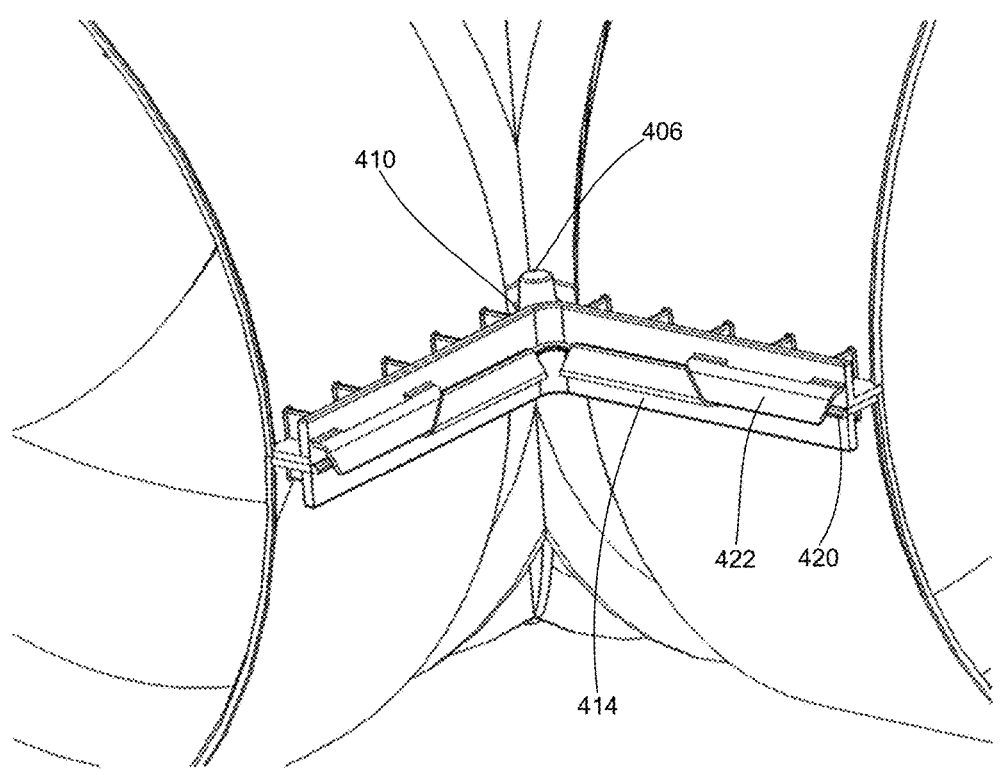
FIG. 14 illustrates a closer view of a region of the example fastener and a manifold, consistent with disclosed embodiments.

FIG. 14 illustrates a closer view of a region of the embodiment of manifold 400 and fasteners depicted in FIG. 13, consistent with disclosed embodiments. Specifically, FIG. 14 illustrates the aforementioned pin 406, hole 410, L-shaped bracket 414, the rail 420, and the trapezoidal sliding sections 422. As mentioned above, each of these aforementioned structure(s) of the fastener play a vital role in ensuring a secure and sound connection between first part 402 and second part 404, thereby forming a structurally-sound manifold 400.

Figure 15:
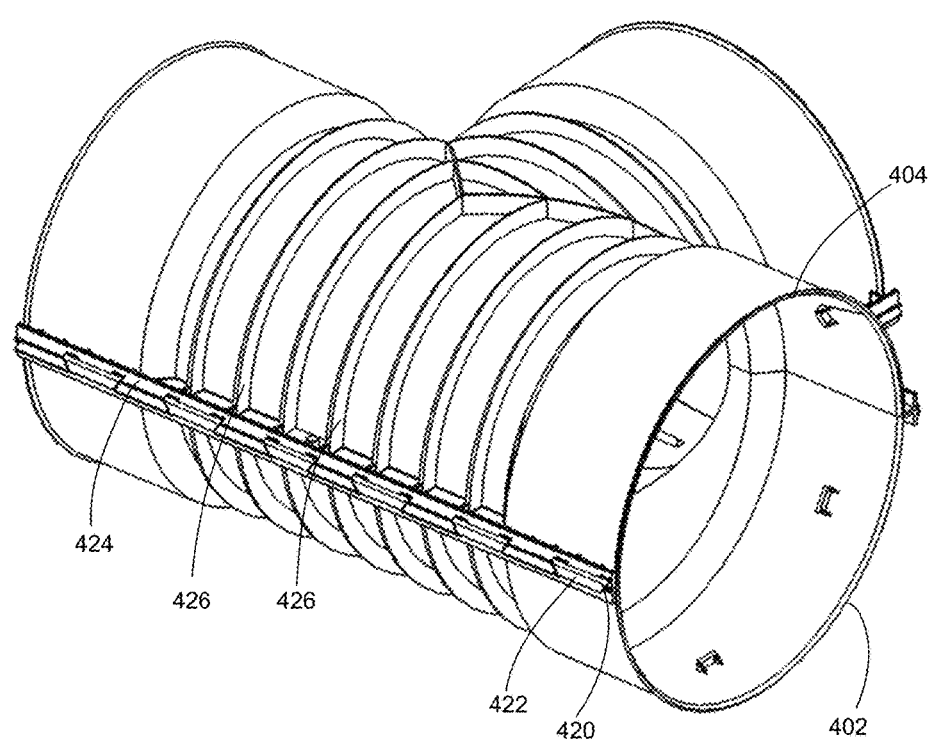
FIG. 15 illustrates a perspective back view of the fourth embodiment of an example fastener and a manifold wherein the manifold is connected, consistent with disclosed embodiments.

FIG. 15 illustrates a perspective back view of the embodiment of manifold 400 and fasteners depicted in FIGS. 13 and 14, wherein the manifold is in a closed, connected configuration, consistent with disclosed embodiments. As seen in FIG. 15, the user(s) and or practitioner(s) may utilize the fastener to connect, fit, secure, snap and/or snap-fit first part 402 and second part 404. As further seen in FIG. 15, the fasteners further comprise an elongated back structure 424, an elongated rail 420 along the elongated back structure 424, a plurality of sliding sections 422 each having a trapezoidal shape, and buttressing supporting structures 426.

As further seen in FIG. 15, each of the plurality of trapezoidal sliding sections 422 may move and/or slide along and/or upon the rail 420. Indeed, the user(s) and/or practitioner(s) may utilize each of the trapezoidal sliding sections 422 to ensure that the connection between first part 402 and second part 404 may be a secure connection that minimizes leaking, thereby forming a structurally-sound manifold 400. Moreover, the user(s) and/or practitioner(s) may, in a facile, effective, and efficient manner, move first part 402 and second part 404 close to each other and/or in proximity to one another to connect, snap, and/or snap-fit with one another. Thereafter, the user(s) and/or practitioner may move each of the trapezoidal sliding sections 422 along the rail 420 appropriately to ensure a secure connection between first part 402 and second part 404. In this manner, the elongated back structure 424 connects the first part 402 and the second part 404 in a secure and sound connection with minimal leaking, thereby forming a structurally-sound manifold 400.

Also, as seen in FIG. 15, the buttressing structures 426 may also connect first part 402 and second part 404. Moreover, the buttressing structures 426 further support the connection between first part 402 and second part 404, thereby resulting in a secure connection between first part 402 and second part 404 and forming a structurally-sound manifold 400.

Indeed, the manifold 400 and associated fastener of FIGS. 13-15 may be manufactured from various materials, including metal, plastic, rubber, cast iron, brass, bronze, composite materials, and/or a combination of one or more of the aforementioned materials. Moreover, the manifold 400 and associated fastener may be manufactured via molding (injection molding, blow molding, rotational molding, etc.), forming (thermoforming, roll forming, etc.), forging, casting, subtractive machining, stamping, extruding, 3D printing, and/or a combination of the aforementioned manufacturing methods, as appropriate.

The disclosure provides for a fastener for fastening at least two parts, comprising one or more brackets, an elongated back structure, wherein the at least two parts include a first part and a second part, the first and second parts being connected to form a manifold, wherein the one or more brackets connect the first part and the second part, and the elongated back structure connects the first part and the second part.

The fastener further comprises wherein each bracket of the one or more brackets is L-shaped, wherein each bracket further comprises a rail, and wherein the rail is an elongated rail along the length of the bracket. Moreover, the fastener further comprises wherein each bracket further comprises one or more sliding sections, wherein each sliding section is configured to slide along the rail, and wherein each sliding section of the one or more sliding sections has a substantially rectangular shape. In still further embodiments, each sliding section of the one or more sliding sections has a trapezoidal shape.

The fastener further comprises wherein the elongated back structure further comprises a rail, wherein the rail is an elongated rail along the length of the elongated back structure. In still further embodiments, the elongated back structure further comprises a plurality of sliding sections, wherein each sliding section is configured to slide along the rail. Each sliding section of the one or more sliding sections may have a substantially rectangular shape or a trapezoidal shape. In still further embodiments of the fastener, a buttressing structure connects the first part and the second part.

The disclosure also provides for a fastener for fastening at least two parts, comprising one or more pins and one or more tabs on a first part, one or more holes and one or more connectors on a second part, an elongated back structure, wherein the one or more pins of the first part are snapped onto the one or more holes of the second part and the one or more tabs of the first part are snapped onto the one or more connectors of the second part to form a manifold, and wherein the elongated back structure connects the first part and the second part.

The fastener further comprises one or more brackets, wherein each bracket of the one or more brackets forms at the connection between the first part and the second part, and wherein each bracket of the one or more brackets is L-shaped.

The fastener's aforementioned elongated back structure may further comprise a pin that connects with a hole or an elongated tab that connects with an elongated slot.

The fastener may further comprise a buttressing structure that connects the first part and the second part.

It will be apparent to persons skilled in the art that various modifications and variations can be made to the disclosed structure. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A fastener for fastening at least two parts, comprising:
one or more pins on a first part, the one or more pins comprising a plurality of elongated grooves extending along a height of the one or more pins;
one or more holes on a second part;
one or more brackets comprising one or more rails; and
one or more sliding sections;
wherein the one or more pins on the first part are inserted into the one or more holes on the second part to form a manifold; and
wherein the one or more sliding sections are configured to slide along the one or more rails.

2. The fastener of claim 1, wherein the one or more sliding sections have a rectangular shape.

3. The fastener of claim 1, wherein the one or more rails is elongated along a length of the one or more brackets.

4. The fastener of claim 1, wherein the one or more brackets comprise an L-shaped bracket.

5. The fastener of claim 1, further comprising an elongated back section.

6. The fastener of claim 5, wherein the elongated back section comprises an elongated rail.

7. The fastener of claim 6, wherein the elongated back section further comprises one or more sliding sections.

8. The fastener of claim 7, wherein the one or more sliding sections are configured to slide along the elongated rail.

9. The fastener of claim 8, wherein the one or more sliding sections are a rectangular shape.

10. The fastener of claim 5, wherein the elongated back section comprises one or more buttressing structures.

11. The fastener of claim 10, wherein the one or more buttressing structures are configured to support a connection between the at least two parts.

12. The fastener of claim 10, wherein each buttressing structure of the one or more buttressing structures is formed on an external surface of the first part.

13. The fastener of claim 10, wherein each buttressing structure of the one or more buttressing structures is formed on an external surface of the second part.

14. The fastener of claim 1, wherein the one or more pins are configured to snap-fit into the one or more holes.

15. The fastener of claim 1, wherein the one or more sliding sections are configured to minimize leakage from the manifold.

16. The fastener of claim 1, wherein the one or more brackets comprise two L-shaped brackets.

17. The fastener of claim 1, wherein the manifold comprises a first opening, a second opening, and a third opening, wherein each of the first opening, the second opening, and the third opening are configured to receive a pipe.

18. The fastener of claim 1, wherein the at least two parts each comprise corrugations on an inner surface and an outer surface.

19. The fastener of claim 1, wherein the manifold is a tee manifold.

20. The fastener of claim 1, wherein the manifold is an elbow manifold.

* * * * *